United States Patent
Cakulev et al.

(10) Patent No.: US 11,792,689 B2
(45) Date of Patent: Oct. 17, 2023

(54) METHOD AND SYSTEM FOR POLICY CONTROL EVENT EXPOSURE

(71) Applicant: Verizon Patent and Licensing Inc., Basking Ridge, NJ (US)

(72) Inventors: Violeta Cakulev, Millburn, NJ (US); Sudhakar Reddy Patil, Flower Mound, TX (US); Raquel Morera Sempere, Weehawken, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 17/399,250

(22) Filed: Aug. 11, 2021

(65) Prior Publication Data

US 2023/0051735 A1    Feb. 16, 2023

(51) Int. Cl.
| | |
|---|---|
| *H04W 28/08* | (2023.01) |
| *H04W 8/02* | (2009.01) |
| *H04W 8/18* | (2009.01) |
| *H04W 28/02* | (2009.01) |

(52) U.S. Cl.
CPC ......... *H04W 28/0925* (2020.05); *H04W 8/02* (2013.01); *H04W 8/18* (2013.01); *H04W 28/0268* (2013.01)

(58) Field of Classification Search
CPC ......... H04W 8/02; H04W 8/18; H04W 28/00; H04W 28/0268; H04W 28/0925
See application file for complete search history.

(56) References Cited

U.S. PATENT DOCUMENTS

2019/0253917 A1* 8/2019 Dao ..................... H04M 15/00
2021/0176366 A1* 6/2021 Garcia Azorero .... H04M 15/66

FOREIGN PATENT DOCUMENTS

WO    WO-2022042220 A1 *  3/2022

OTHER PUBLICATIONS

ETSI, "5G; 5G System; Policy Authorization Service; Stage 3 (3GPP TS 29.514 version 16.8.0 Release 16)", ETSI TS 129 514 V16.8.0, Apr. 2021. (Year: 2021).*

* cited by examiner

*Primary Examiner* — Khoa Huynh

(57) ABSTRACT

A method, a device, and a non-transitory storage medium are described in which a policy control event exposure service is provided. The service may include a policy control event exposure service that supports quality of service (QoS)-based event subscription and access and mobility (AM)-based event subscription. The service may notify network function consumers when a QoS-based event or an AM-based event occurs.

20 Claims, 6 Drawing Sheets

METHOD AND SYSTEM FOR POLICY CONTROL EVENT EXPOSURE

BACKGROUND

Development and design of networks present certain challenges from a network-side perspective and an end device perspective. For example, Next Generation (NG) wireless networks, such as Fifth Generation New Radio (5G NR) networks are being deployed and under development.

DETAILED DESCRIPTION

Figure 1:
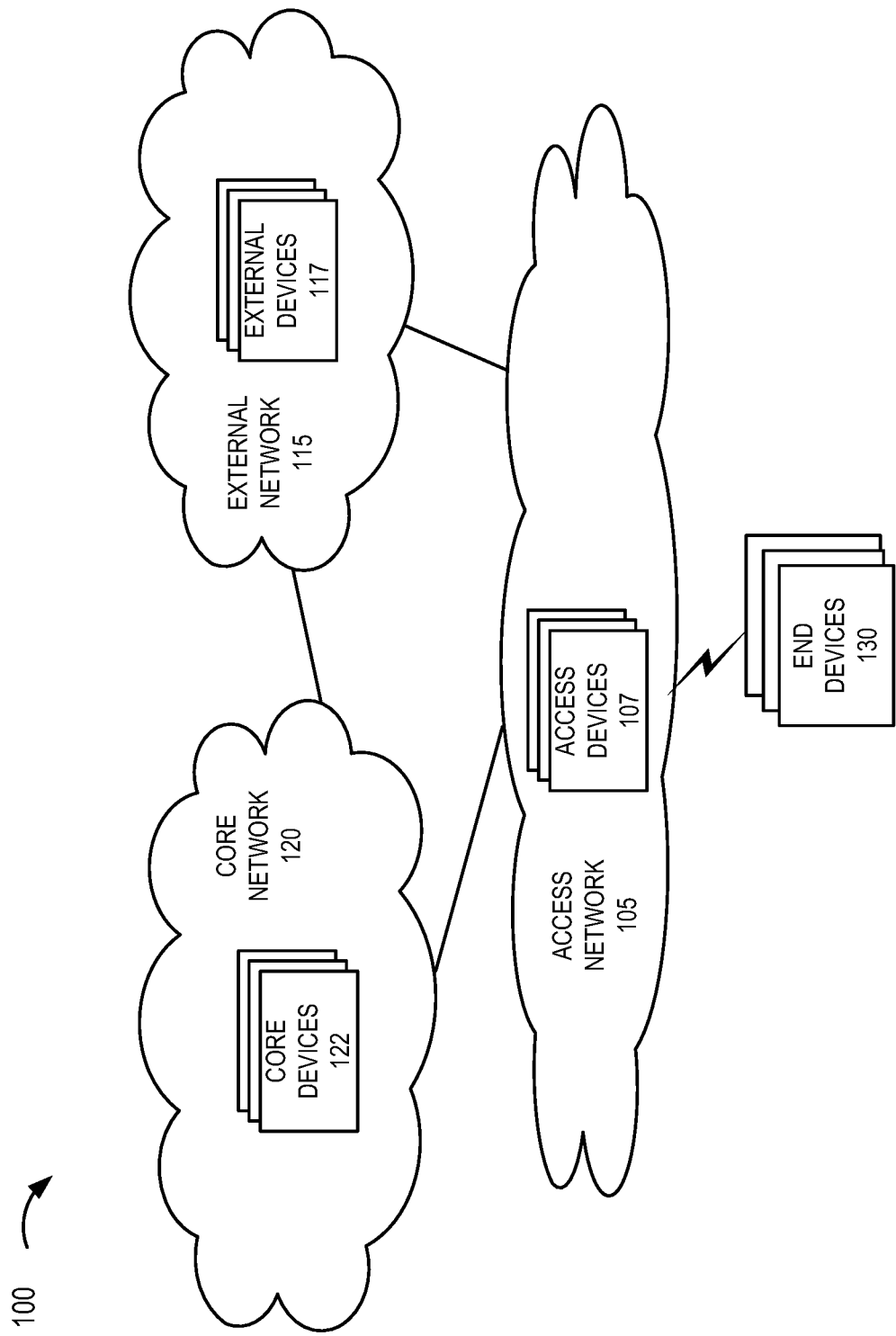
FIG. 1 is a diagram illustrating an exemplary environment in which an exemplary embodiment of a policy control event exposure service may be implemented.

The following detailed description refers to the accompanying drawings. The same reference numbers in different drawings may identify the same or similar elements. Also, the following detailed description does not limit the invention.

Network operators, standardizing entities (e.g., Third Generation Partnership Project (3GPP), 3GPP2, International Telecommunication Union (ITU), European Telecommunications Standards Institute (ETSI), GSM Association (GSMA), etc.), and other types of entities have considered the implementation of event exposure services that allow network function (NF) service consumers to subscribe to, modify, and unsubscribe from NF service producer events, and notify the NF service consumers about observed events. Currently, the types of observed events are limited to public land mobile network (PLMN) identifier notification and access type change.

According to exemplary embodiments, a policy control event exposure service is described. According to an exemplary embodiment, the policy control event exposure service includes events in addition to PLMN identifier notification and access type change. For example, the policy control event exposure service may include quality of service (QoS)-based policy control events and access and mobility-based events. According to an exemplary embodiment, the QoS-based events may include 5G QoS Identifier (5QI) type events, Allocation and Retention Policy (ARP) type events, and Maximum Flow Bit Rate (MFBR) type events. According to an exemplary embodiment, the access and mobility-based events may include radio access technology (RAT)/frequency selection priority (RFSP) and user equipment aggregate maximum bit rate (UE AMBR).

According to an exemplary embodiment, the policy control event exposure service may include event type specific messages and/or procedures pertaining to the QoS-based and access and mobility-based event types. For example, the policy control event exposure service may include messages that have QoS-based information in support of the QoS-based type events and access and mobility-based information in support of access and mobility type events, as described herein. As such, subscription procedures, event detection procedures, event notification procedures, authorization procedures, and corresponding messages of the policy control event exposure service may support various types of events.

In view of the foregoing, the policy control event exposure service may support in a network the provisioning and management thereof pertaining to QoS and access and mobility events. For example, a session management policy control function (SM PCF) or an access management PCF (AM PCF) may update policies pertaining to various events not currently supported by policy control event exposure services. Additionally, service consumers, when notified of events, as described herein, may perform actions that improve wireless services and/or application layer services from the network-side and/or end device-side perspective(s). For example, the service consumer may update a subscriber profile identifier of a subscriber profile based on the notification of the event. The updated subscriber profile may be distributed to other network devices (e.g., home subscriber server (HSS) device, unified data management (UDM) device, and/or another type of network device). For example, an update to Subscriber Profile Identifier (SPID) when propagated to a radio access network (RAN) through an access and mobility management function (AMF) or a mobility management entity (MME), may allow the RAN to apply special policies for that UE. Examples of such policies may include mobility policies, frequency spectrum policies, timer policies, and/or other types of policies that may pertain to the UE.

FIG. 1 is a diagram illustrating an exemplary environment 100 in which an exemplary embodiment of policy control event exposure service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary. For purposes of description, end device 130 is not considered a network device.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the policy control event exposure service may use at least one of these planes of communication. Additionally, an interface of a network device may be modified (e.g., relative to an interface defined by a standards body, such as 3GPP, 3GPP2, ITU, ETSI, GSMA, etc.) or a new interface of the network device may be provided in order to support the communication (e.g., transmission and reception of messages, information elements (IE), attribute value pairs (AVPs), objects, parameters, or other form of information) between network devices and the policy control event exposure service logic of the network device, as described herein. According to various exemplary implementations, the interface of the network device may be a service-based interface, a reference point-based interface, an Open Radio Access Network (O-RAN) interface, a 5G interface, another generation of interface (e.g., 5.5G, 6G, 7G, etc.), or some other type of interface.

Access network 105 may include one or multiple networks of one or multiple types and technologies. For example, access network 105 may be implemented to include a 5G RAN, a future generation RAN (e.g., a sixth generation (6G) RAN, a seventh generation (7G) RAN, or a subsequent generation RAN), a centralized-RAN (C-RAN), and/or another type of access network. Access network 105 may include a legacy RAN (e.g., a third generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, and/or core network 120.

Access network 105 may include different and multiple functional splitting, such as options 1, 2, 3, 4, 5, 6, 7, or 8 that relate to combinations of access network 105 and core network 120 including an evolved packet core (EPC) network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), a centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher, carrier aggregation (CA), edge and core network slicing, coordinated multipoint (CoMP), various duplex schemes, and/or another type of connectivity service (e.g., non-standalone (NSA) new radio (NR), stand-alone (SA) NR, etc.).

According to some exemplary embodiments, access network 105 may be implemented to include various architectures of wireless service, such as, for example, 5G, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., RATs, etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access.

External network 115 may include one or multiple networks of one or multiple types and technologies. For example, external network 115 may be implemented to include a service or an application layer network, a cloud network, a private network, a public network, a MEC network, a fog network, the Internet, a packet data network (PDN), a service provider network, the World Wide Web (WWW), an Internet Protocol Multimedia Subsystem (IMS)

network, a Rich Communication Service (RCS) network, an SDN, a virtual network, a packet-switched network, a data center, or other type of network that may provide access to and may host an end device application, service, or asset (application service).

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines (VMs), SDN devices, cloud computing devices, platforms, and other types of network devices and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Core network 120 may include one or multiple networks of one or multiple network types and technologies. Core network 120 may include a complementary network of access network 105. For example, core network 120 may be implemented to include a 5G core network, an EPC of an LTE network, an LTE-Advanced (LTE-A) network, and/or an LTE-A Pro network, a future generation core network (e.g., a 5.5G, a 6G, a 7G, or beyond core network, etc.), and/or another type of core network.

Depending on the implementation of core network 120, core network 120 may include various types of network devices that are illustrated in FIG. 1 as core devices 122. For example, core devices 122 may include a UPF, a Non-3GPP Interworking Function (N3IWF), an access and management mobility function (AMF), a session management function (SMF), a UDM, a unified data repository (UDR), an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a HSS, an authentication, authorization, and accounting (AAA) server, a policy and charging rules function (PCRF), a policy and charging enforcement function (PCEF), and/or a charging system (CS).

According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

Core devices 122 may include a split core device 122. For example, core devices 122 may include an SM PCF, an AM PCF, a UE PCF, and/or another type of split architecture associated with another core device 122, as described herein. For example, the SM PCF may provide policy control functionalities and information relating to session management, such as QoS and charging rules, gating, service flow detection, and network slice selection information associated with end device 130. Additionally, the AM PCF may provide policy control functionalities and information relating to access and mobility management, such as enforcement control of policies relating to RFSP and service area restrictions, for example. The UE PCF may manage UE management service-related policies, such as UE Route Selection Policies (URSP) rules.

According to an exemplary embodiment, at least a portion of core devices 122 may include policy control event exposure service logic and an interface that supports the policy control event exposure service, as described herein. According to some exemplary embodiments, other network devices of other types of networks (e.g., access network 105, external network 115, an X-haul network, or another type of network) may include policy control event exposure service logic and an interface that supports the policy control event exposure service, as described herein.

End devices 130 include a device that may have computational and/or communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or other type of wireless device (e.g., other type of user equipment (UE)). End device 130 may be configured to execute various types of software (e.g., applications, programs, etc.). The number and the types of software may vary among end devices 130. End devices 130 may include "edge-aware" and/or "edge-unaware" application service clients. According to an exemplary embodiment, end device 130 is not to be considered a network device, as described herein.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130.

Figure 2A:
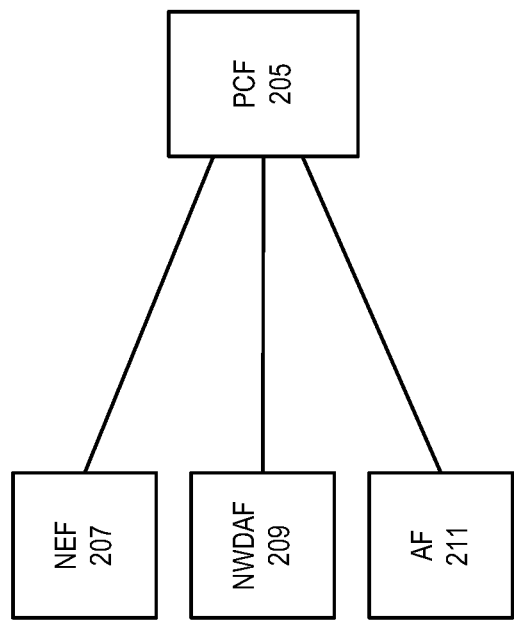
FIG. 2A is a diagram illustrating another exemplary environment in which exemplary embodiments of the policy control event exposure service may be implemented.
Figure 2A:

FIG. 2A is a diagram illustrating an exemplary environment 200 in which an exemplary embodiment of policy control event exposure service may be implemented. As illustrated, environment 200 may include a PCF 205, a NEF 207, an NWDAF 209, and an AF 211. According to other exemplary embodiments, environment 200 may include additional, different, and/or fewer network devices than those depicted and described in relation to FIG. 2A.

PCF 205 may include a PCF (e.g., that includes at least AM PCF and SM PCF functionalities) a split architecture of a PCF, such as an AM PCF, an SM PCF, or a UE PCF, or a sub-combination thereof (e.g., AM PCF and SM PCF, etc.), for example. Additionally, or alternatively, other types of split architectures that may include dedicated PCFs may be implemented. PCF 205 may include functions and/or services specified and/or defined by a standards body such as 3GPP, 3GPP2, ITU, ETSI, GSMA, or other types of standards, and/or functions and/or services of a proprietary nature. For example, PCF 205 may include logic that provides policy control decisions and flow-based charging control functionalities, access and mobility policy decisions for control of end devices, service area restrictions, RFSP control, UE policy decisions, QoS control, traffic steering/routing, gating control, network slice enablement, and other functionalities and/or services. Additionally, PCF 205 may include logic that provides the policy control event exposure service, as described herein.

NEF 207, NWDAF 209, and AF 211 may each include functions and/or services specified and/or defined by a standards body such as 3GPP, 3GPP2, ITU, ETSI, GSMA, or other types of standards, and/or functions and/or services of a proprietary nature. For example, NEF 207 may include logic that provides secure exposure of network services and resources over application programming interfaces (APIs) within and outside of a 5G core (e.g., toward third party applications, etc.), for example. NWDAF 209 may include logic that collects data and provides analytic services, which may pertain to network conditions, device behavior, service experience, and/or other configurable metrics, for example. AF 211 may include logic that provides application influence on traffic routing, accessing NEF, and interaction with policy framework for policy control, for example. Additionally, NEF 207, NWDAF 209, and AF 211 may each include logic that provides the policy control event exposure service, as described herein.

The connections illustrated between PCF 205 and NEF 207, NWDAF 209, and AF 211 are exemplary. Additionally, as previously described, the interface of a network device may be a service-based interface, a reference point-based interface, a 5G interface, another generation of interface (e.g., 5.5G, 6G, 7G, etc.), or some other type of interface. For example, the interfaces include an Npcf interface, an Nnef interface, an Nnwdaf interface, an Naf interface, an N23 interface, an N30 interface, an N5 interface, and so forth.

While Npcf, Nnef, Nnwdaf, and Naf interfaces may align with nomenclature of a 3GPP service-based architecture in a control plane of a 5G core network, for example, the policy control event exposure service, as described herein, is not limited to such nomenclature and/or functionality. Additionally, according to some exemplary embodiments, an interface (e.g., Npcf, N5, etc.) may operate according to some or all of the configurations and/or functionality defined by a standard and additionally operate/support an exemplary embodiment of the policy control event exposure service. For example, as previously mentioned, the interface may support the transmission and reception of messages that include data and/or information of the policy control event exposure service. According to an exemplary embodiment, the data and/or information may include QoS-based information or access management and mobility information, as described herein. For example, a message may include an IE, an AVP, an object, a parameter, a field, or another type of instance of data that pertains to and supports the policy control event exposure service logic, as described herein.

For purposes of description, NEF 207, NWDAF 209, and AF 211 are exemplary NF service consumers. According to other exemplary embodiments, additional, fewer, and/or different NFs of core network 120 may be NF service consumers of the policy control event exposure service, as described herein.

Figure 2B:
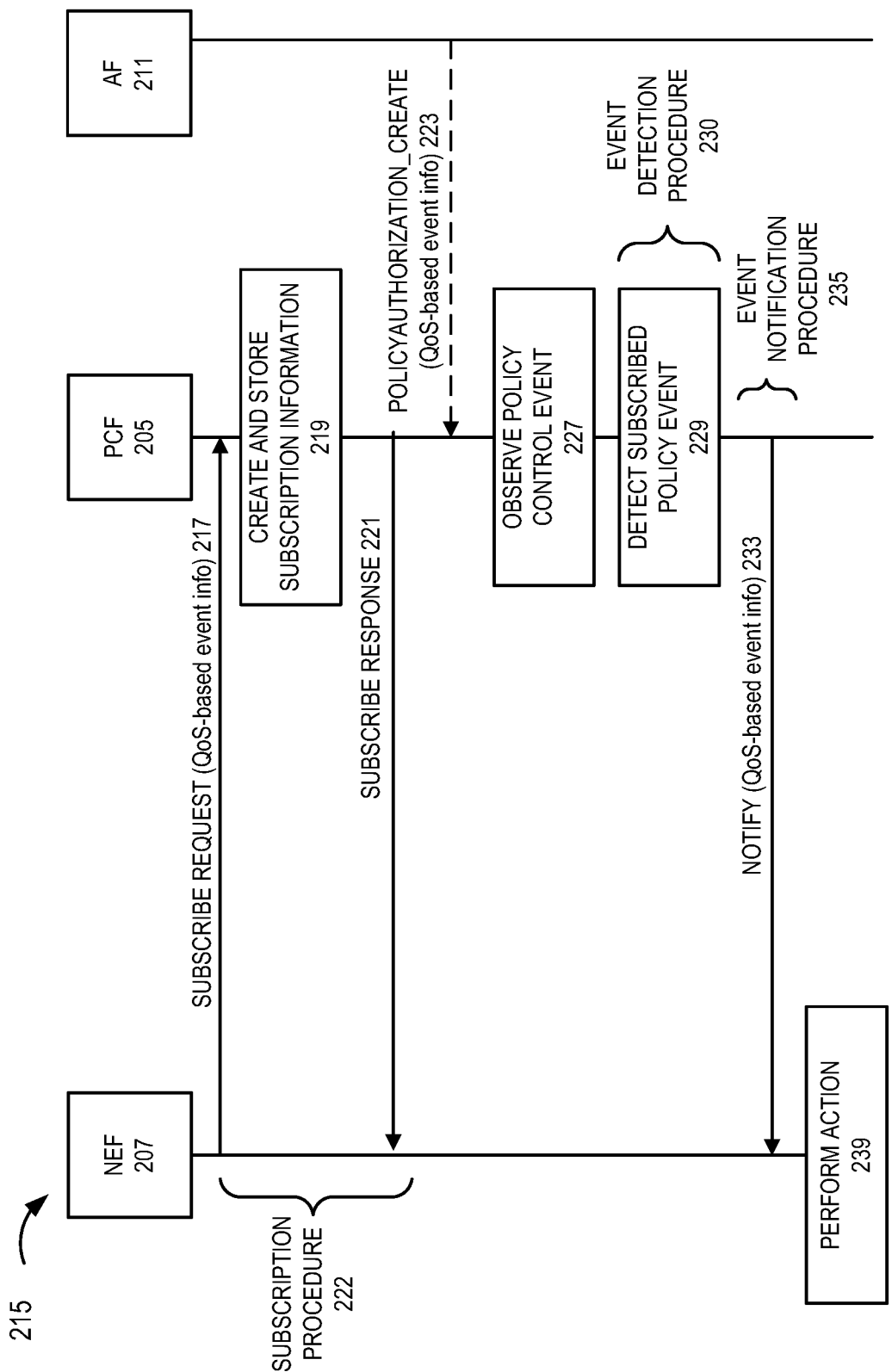
FIG. 2B is a diagram illustrating an exemplary process of an exemplary embodiment of the policy control event exposure service.

FIG. 2B is a diagram illustrating an exemplary process 215 of an exemplary embodiment of the policy control event exposure service. For purposes of description, process 215 is described in relation to NEF 207. However, according to other exemplary embodiments, a different type of NF service consumer or NF other than NEF 207 may be implemented.

Referring to FIG. 2B, a subscription procedure 222 is illustrated in which NEF 207 may generate and transmit a subscribe request 217, which includes QoS-based event information, to PCF 205. The QoS-based event information may indicate a QoS-based policy control event to which NEF 207 is (newly) subscribing for event notification. For example, according to various exemplary embodiments, the QoS-based policy control event information may include a 5QI, an ARP value, and/or an MFBR information. By way of further example, the 5QI may include a specific 5QI value (e.g., 1, 4, 9, 82, etc.), a range of 5QIs (e.g., 1-4, 5-9, etc.), and/or a set of 5QIs (e.g., 65-67 and 82-85; 71-74 and 5-9, 69; etc.). Also, the ARP value may include a specific preemption vulnerability indication (PVI) value, a preemption capability indication (PCI) value, and/or priority level (PL) value, a range of one or more of these values, and/or a set of one or more of these values. Additionally, the MFBR may include a specific MFBR, a range of MFBR, or set of MFBRs. The QoS-based event information may include other data, such as an identification of end device(s) 130 to which the subscription applies. For example, the identification data may indicate a group of end devices 130 (e.g., a group identifier) or a single end device 130, and/or another type of set of end devices 130. The QoS-based event information may include other types of data relating, such as a uniform resource indicator (URI) indicating where to receive the requested notifications, a notification correlation identifier, and/or event reporting data, such as event notification method, maximum number of reports, monitoring duration, immediate reporting indication, repetition period for periodic reporting, extended session information, and so forth.

Although not illustrated, subscription procedure 222 may include other types of messages (not illustrated). For example, NEF 207 may transmit a message to modify an existing subscription or to unsubscribe or delete a subscription. These subscription type messages may include one or more instances of QoS-based event information, as described herein. These messages may be generated and transmitted by an NF service consumer, such as NEF 207, anytime after a subscription has been established, for example.

As further illustrated, upon successfully receiving subscribe request 217, PCF 205 may create and store subscription information 219. For example, PCF 205 may create or generate a new policy event subscription resource and store the subscription information. PCF 205 may generate and transmit a subscribe response 221 to NEF 207. Subscribe response 221 may include a URI of the created resource and the subscription information. According to another exemplary scenario, when an error occurs relating to subscribe request 217, subscribe response 221 may indicate an error.

Additionally, according to other exemplary scenarios, AF 211 may initiate a new subscription using a policy authorization create message 223, which is illustrated in FIG. 2B for description purposes. As illustrated, policy authorization create message 223 may include QoS-based event information, which may be of similar kind to that previously described. PCF 205 may perform similar operations responsive to an error-free context, as described herein. Similarly, AF 211 may modify or unsubscribe/delete a subscription.

After establishment of the subscription, process 215 may include PCF 205 observing a policy control event 227. For example, PCF 205 may receive a message from core device 122 or external device 117 regarding a QoS flow/bearer. By way of further example, an application service device (e.g., an application service server—not illustrated) may trigger the creation of a QoS flow or bearer. PCF 205 may assist in the establishment of the QoS flow/bearer. The request for creation of additional QoS flows/bearers is utilized commonly for example to create a Guaranteed Bit Rate dedicated bearer when a voice call is setup. Similarly, a lower latency dedicated flow/bearer may be established when an AR/VR application is launched.

During or upon the establishment of the QoS flow or bearer, PCF 205 may perform an event detection procedure 230. For example, PCF 205 may determine whether this event is a subscribed event. For example, PCF 205 may perform a lookup of stored subscription information and determine whether to provide event notification to a policy control event subscriber. PCF 205 may compare subscription information to information pertaining to the creation of the QoS flow/bearer. For example, PCF 205 may compare a QCI value and UE identifier (e.g., a Subscription Permanent Identifier (SUFI), a UE group identifier, or another type of 5G identifier that (uniquely) identifies end device(s) 130) to the subscription information. When a comparison results in a match, PCF 205 may determine that a subscribed policy event (e.g., a QoS-based policy control exposure event) is detected 229. Alternatively, when the comparison does not produce a match, PCF 205 may determine that no subscribed policy event has occurred.

According to this exemplary scenario, assume that PCF 205 detects a subscribed QoS-based policy control exposure event, and performs an event notification procedure 235. For example, PCF 205 may generate and transmit a notify message 233, which may include QoS-based event information. For example, notify message 233 may include the URI (e.g., the notification URI) as previously described and QoS values pertaining to the QoS flow/bearer. Notify message 233 may include the identifier(s) pertaining to the end device(s) 130 and date and timestamp information. Notify message 233 may include session-related information, such as a single-network slice selection assistance information (S-NSSAI), a data network name (DNN), an IP address of end device(s) 130, an AF identifier, and/or other types of QoS attribute information.

As further illustrated, in response to successfully receiving and processing notify message 233, NEF 207 may perform an action 239. For example, NEF 207 may expose the policy control event and/or other information of relevance pertaining to the event (e.g., from other core devices 122) to an AF.

FIG. 2B is a diagram illustrating exemplary process 215, however, according to other exemplary embodiments, additional, different, and/or fewer steps or procedures may be implemented. Additionally, as previously described, process 215 may involve a different type of NF service consumer. For example, for process 215, the subscribe request 217 may be invoked directly by a trusted entity while an untrusted entity may use NEF 207 as shown in FIG. 2B. An example of a subscriber of such events may be a resource monitoring system that may keep a count of the number of flows/bearers that have been setup for a particular slice. According to another example of a subscriber of such events may be a system that dynamically manages privileges assigned to a particular end device 130 during the lifetime of the existence of a specified flow/bearer.

Figure 2C:
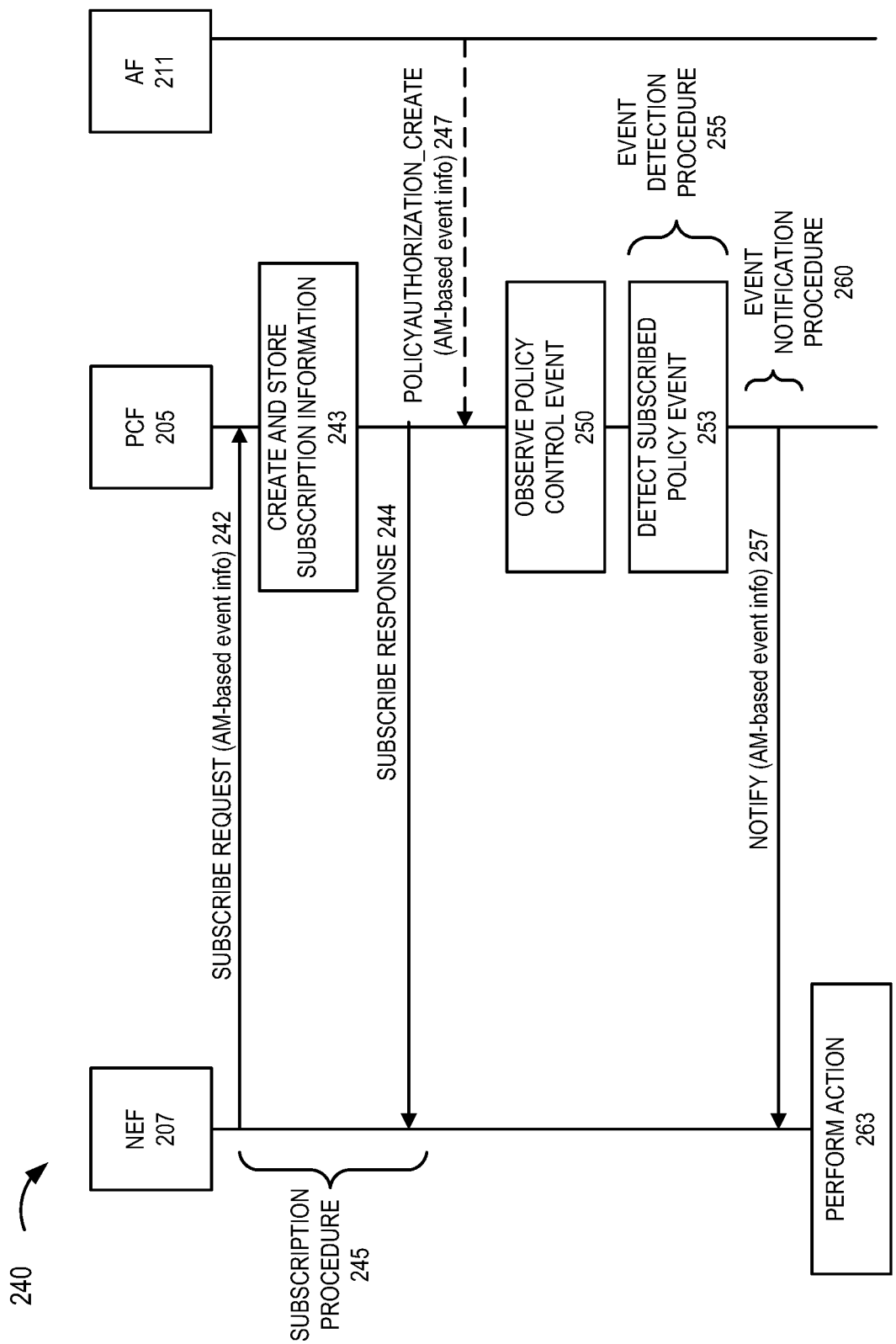
FIG. 2C is a diagram illustrating another exemplary process of an exemplary embodiment of the policy control event exposure service.

FIG. 2C is a diagram illustrating another exemplary process 240 of an exemplary embodiment of the policy control event exposure service. For purposes of description, process 240 is described in relation to NEF 207. However, according to other exemplary embodiments, a different type of NF service consumer or NF other than NEF 207 may be implemented.

Referring to FIG. 2C, a subscription procedure 245 is illustrated in which NEF 207 may generate and transmit a subscribe request 242, which includes access and mobility (AM)-based event information, to PCF 205. The AM-based event information may indicate an AM-based policy control event to which NEF 207 is (newly) subscribing for event notification. For example, according to various exemplary embodiments, the AM-based policy control event information may include an RFSP index or a UE AMBR. By way of further example, the RFSP index may include a specific index, a range of indexes, and/or a set of indexes. Generally, the RFSP index may be mapped by access network 105 (e.g., RAN) to a defined configuration. The RFSP index may be UE specific and may apply to radio bearers. Also, the UE AMBR may include a specific AMBR, a range of one or more of these values, and/or a set of one or more of these values. The AM-based event information may include other data, such as an identification of end device(s) 130 to which the subscription applies. For example, the identification data may indicate a group of end devices 130 (e.g., a group identifier) or a single end device 130, and/or another type of set of end devices 130. The AM-based event information may include other types of data relating, such as a URI indicating where to receive the requested notifications, a notification correlation identifier, and/or event reporting data, such as event notification method, maximum number of reports, monitoring duration, immediate reporting indication, repetition period for periodic reporting, extended session information, and so forth.

Although not illustrated, subscription procedure 245 may include other types of messages (not illustrated). For example, NEF 207 may transmit a message to modify an existing subscription or to unsubscribe or delete a subscription. These subscription type messages may include one or more instances of AM-based event information, as described herein. These messages may be generated and transmitted by an NF service consumer, such as NEF 207, any time after a subscription has been established, for example.

As further illustrated, upon successfully receiving subscribe request 242, PCF 205 may create and store subscription information 243. For example, PCF 205 may create or generate a new policy event subscription resource and store the subscription information. PCF 205 may generate and transmit a subscribe response 244 to NEF 207. Subscribe response 244 may include a URI of the created resource and the subscription information. According to another exemplary scenario, when an error occurs relating to subscribe request 242, subscribe response 244 may indicate an error.

Additionally, according to other exemplary scenarios, AF 211 may initiate a new subscription using a policy authorization create message 247, which is illustrated in FIG. 2C for description purposes. As illustrated, policy authorization create message 247 may include AM-based event information, which may be of similar kind to that previously described. PCF 205 may perform similar operations responsive to an error-free context, as described herein. Similarly, AF 211 may modify or unsubscribe/delete a subscription.

After establishment of the subscription, process 240 may include PCF 205 observing a policy control event 250. For example, PCF 205 may receive a message from core device 122 or external device 117 regarding a QoS flow/bearer. By way of further example, a third party application service device (e.g., an application service server—not illustrated) may trigger the creation of a QoS flow or bearer. PCF 205 may assist in the establishment of the QoS flow/bearer.

During or upon the establishment of the QoS flow or bearer, PCF 205 may perform an event detection procedure 255. For example, PCF 205 may determine whether this event is a subscribed event. For example, PCF 205 may perform a lookup of stored subscription information and determine whether to provide event notification to a policy control event subscriber. PCF 205 may compare subscription information to information pertaining to the creation of the QoS flow/bearer. For example, PCF 205 may compare an RFSP index and UE identifier (e.g., a SUPI, a UE group identifier, or another type of 5G identifier that (uniquely) identifies end device(s) 130) to the subscription information. When there is a match, PCF 205 may determine that a subscribed policy event (e.g., an AM-based policy control exposure event) is detected 253. When there is not a match, PCF 205 may determine that no subscribed policy event has occurred.

According to this exemplary scenario, assume that PCF 205 detects a subscribed AM-based policy control exposure event, and performs an event notification procedure 260. For example, PCF 205 may generate and transmit a notify message 257, which may include AM-based event information. For example, notify message 257 may include the URI (e.g., the notification URI) as previously described and AM-based event information pertaining to the QoS flow/bearer. Notify message 257 may include the identifier(s) pertaining to the end device(s) 130 and date and timestamp information. Notify message 257 may include session-related information, such as a single-network slice selection assistance information (S-NSSAI), a data network name (DNN), an IP address of end device(s) 130, an AF identifier, and/or other types of AM attribute information.

As further illustrated, in response to successfully receiving and processing notify message 257, NEF 207 may perform an action 263. For example, NEF 207 may expose the policy control event and/or other information of relevance pertaining to the event (e.g., from other core devices 122) to an AF.

FIG. 2C is a diagram illustrating exemplary process 240, however, according to other exemplary embodiments, additional, different, and/or fewer steps or procedures may be implemented. Additionally, as previously described, process 240 may involve a different type of NF consumer. As an example, PCF 205 may be implemented as an SM PCF and the NF consumer may be implemented as an AM PCF. According to such an example, a third party application service device (e.g., an application service server) may trigger the creation of a high MFBR QoS flow. Upon or during the establishment, the SM PCF may notify the AM PCF. The AM PCF may update access and mobility policies (e.g., update an RFSP index) based on the notification.

Figure 3:
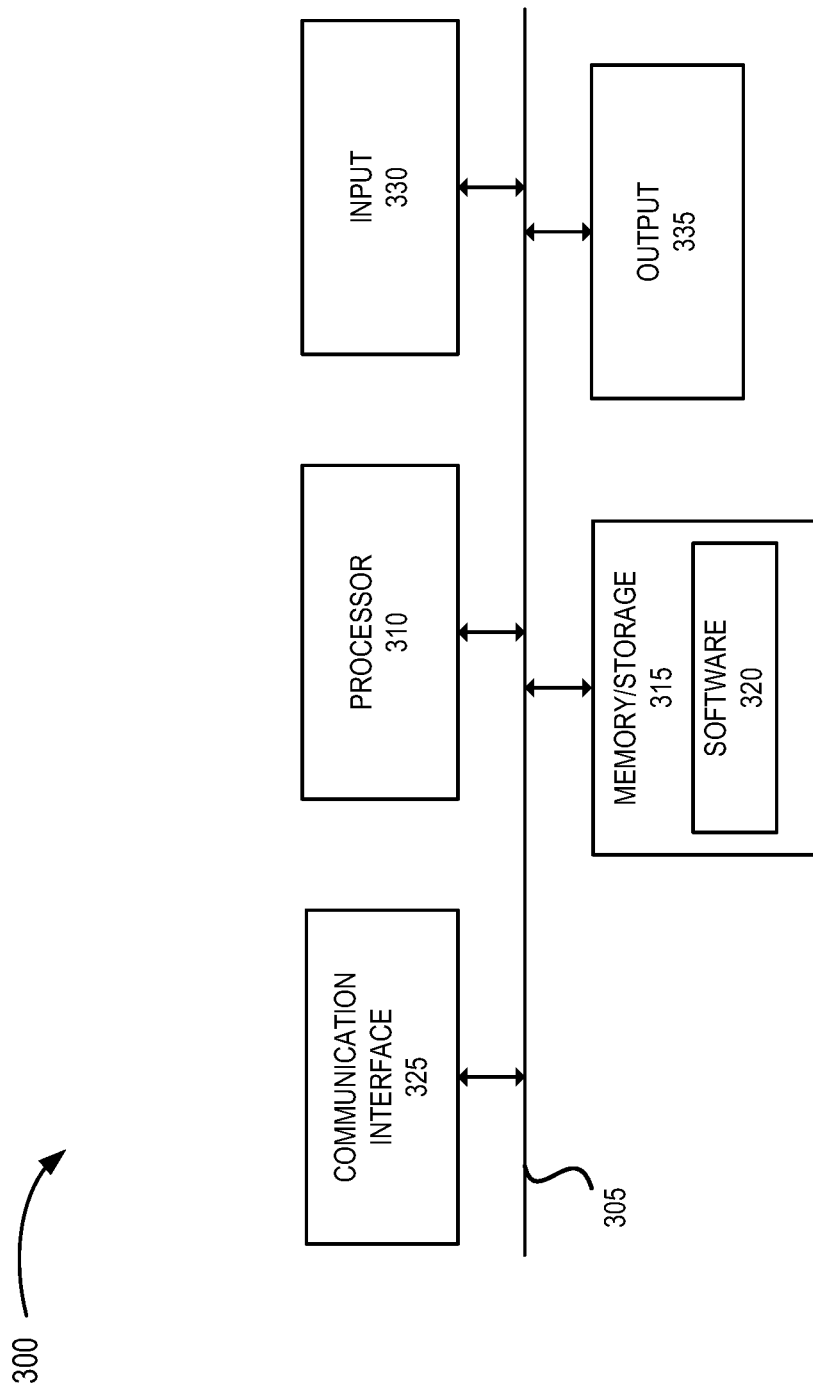
FIG. 3 is a diagram illustrating exemplary components of a device that may correspond to one or more of the devices illustrated and described herein.

FIG. 3 is a diagram illustrating exemplary components of a device 300 that may be included in one or more of the devices described herein. For example, device 300 may correspond to access device 107, external device 117, core device 122, end device 130, PCF 205, NEF 207, NWDAF 209, AF 211, and/or other types of network devices, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to PCF 205, software 320 may include an application that, when executed by processor 310, provides a function and/or a process of policy control event exposure service, as described herein. Additionally, with reference to NEF 207, NWDAF 209, AF 211, or another NF service consumer, software 320 may include an application that, when executed by processor 310, provides a function and/or a process of policy control event exposure service, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include various processing logic or circuitry (e.g., multiplexing/de-multiplexing, filtering, amplifying, converting, error correction, application programming interface (API), etc.). Communication interface 325 may be implemented as a point-to-point interface, a service-based interface, or a reference interface, for example. As previously mentioned, communication interface 325 may support the policy control event exposure service, as described herein.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 300 may be implemented in the same manner. For example, device 300 may be instantiated, created, deleted, or some other operational state during its life-cycle (e.g., refreshed, paused, suspended, rebooting, or another type of state or status), using well-known virtualization technologies. For example, PCF 205, NEF 207, NWDAF 209, AF 211, and/or another type of network device, as described herein, may be a virtualized device.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function or a process described herein. Alternatively, for example, according to other implementations, device 300 performs a function or a process described herein based on the execution of hardware (processor 310, etc.).

Figure 4:
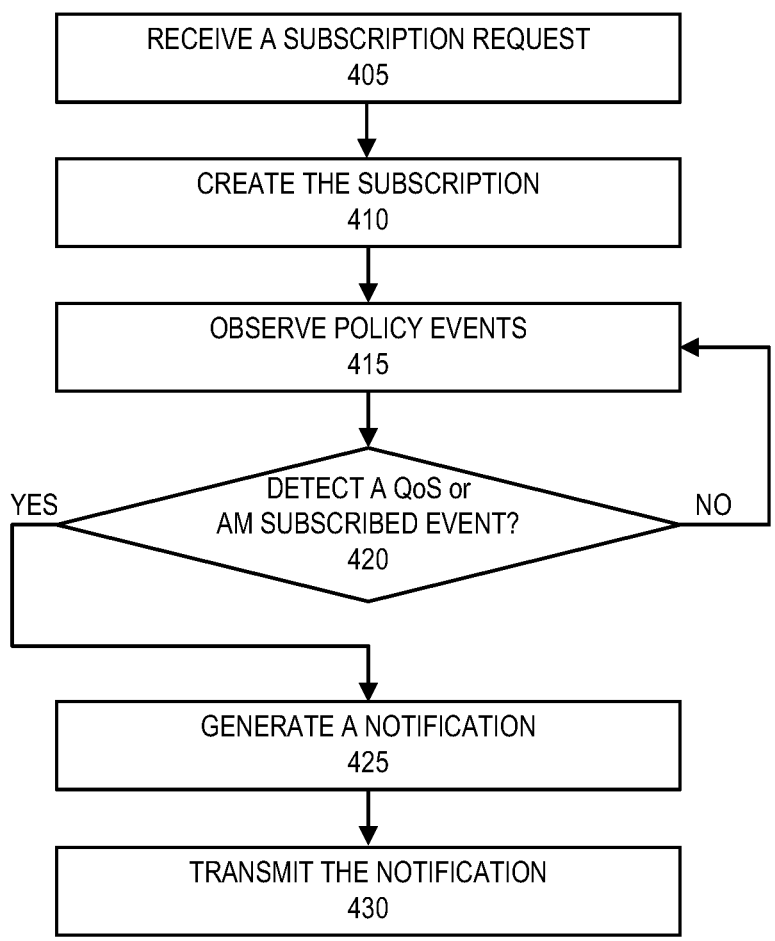
FIG. 4 is a flow diagram illustrating an exemplary process of an exemplary embodiment of a policy control event exposure service.

FIG. 4 is a flow diagram illustrating an exemplary process 400 of an exemplary embodiment of policy control event exposure service. According to an exemplary embodiment, PCF 205 may perform a step of process 400. According to an exemplary implementation, processor 310 executes software 320 to perform the step of process 400, as described herein. Alternatively, the step may be performed by execution of only hardware. Additionally, as described herein, an interface of PCF 205 may support a communication of information for the policy control event exposure service.

In block 405, PCF 205 may receive a subscription request. For example, PCF 205 may receive a subscription request that includes QoS-based event information or AM-based event information, as described herein. According to another example, PCF 205 may receive a policy authorization create message that may include QoS-based or AM-based event information, as described herein. Subscription request may include data that identifies end device(s) 130 and other information, as described herein.

In block 410, PCF 205 may create the subscription. For example, in response to receiving the subscription request, PCF 205 may generate subscription information, and provide a subscription response to the requesting NF device, as described herein.

In block 415, PCF 205 may observe policy events. For example, PCF 205 may detect a trigger that relates to a QoS flow or bearer and policies, as described herein. PCF 205 may provide or facilitate a network procedure relating to the trigger based on PCF 205 functionalities.

In block 420, PCF 205 may determine whether a QoS or AM subscribed event is detected. For example, PCF 205 may compare QoS-based event information or AM-based event information to information of the observed policy event, as described herein. In the absence of a match (block 420—NO), process 400 may return to block 415. Alternatively, in response to a match (block 420—YES), PCF 205 may generate a notification (block 425). For example, the notification may include QoS-based event information or AM-based event information, as described herein.

In block 420, PCF 205 may transmit the notification. For example, PCF 205 may transmit the notification to a URI associated with the subscription.

FIG. 4 illustrates an exemplary embodiment of a process of policy control event exposure service, according to other exemplary embodiments, the policy control event exposure service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIG. 4, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a policy control device from a first network device, a subscription request that includes quality of service (QOS)-based event information, which includes a QoS parameter and QoS values that include a first QoS value and a second QoS value that indicate a QoS range relating to the QoS parameter, or access and mobility (AM)-based event information, which includes an AM parameter and AM values that include a first AM value and a second AM value that indicate an AM range relating to the AM parameter;
   generating, by the policy control device, subscription information based on the subscription request;
   detecting, by the policy control device, an event that matches the subscription information; and
   notifying, by the policy control device, the first network device of the event.

2. The method of claim 1, wherein the policy control device includes at least one of a session management (SM) policy control device or an access management (AM) policy control device.

3. The method of claim 1, wherein the QoS parameter and the QoS values include at least one of a 5G QoS Identifier (5QI) and a range of 5QI values, an Allocation and Retention Policy (ARP) index and a range of ARP values, or a Maximum Flow Bit Rate (MFBR) and a range of MFBR values.

4. The method of claim 3, wherein the QoS-based event information includes one or more identifiers that identify one or more end devices to which a QoS-based event pertains.

5. The method of claim 3, wherein the ARP index includes at least one of a preemption vulnerability indication (PVI) value, a preemption capability indication (PCI) value, or a priority level (PL) value, and wherein the at least one of the PVI value, the PCI value, or the PL value includes a range of values.

6. The method of claim 1, wherein the AM parameter and value includes at least one of a radio access technology frequency selection priority (RFSP) index or a user equipment aggregate maximum bit rate (UE AMBR).

7. The method of claim 6, wherein the UE AMBR indicates a range of UE AMBRs.

8. The method of claim 1, further comprising:
comparing, by the policy control device, information of the event to the subscription information.

9. A network device comprising:
a processor configured to:
receive, from a first network device, a subscription request that includes quality of service (QOS)-based event information, which includes a QoS parameter and QoS values that include a first QoS value and a second QoS value that indicate a QoS range relating to the QoS parameter, or access and mobility (AM)-based event information, which includes an AM parameter and AM values that include a first AM value and a second AM value that indicate an AM range relating to the AM parameter, wherein the network device is a policy control device;
generate subscription information based on the subscription request;
detect an event that matches the subscription information; and
notify the first network device of the event.

10. The network device of claim 9, wherein the policy control device includes at least one of a session management (SM) policy control device or an access management (AM) policy control device.

11. The network device of claim 9, wherein the QoS parameter and the QoS values include at least one of a 5G QoS Identifier (5QI) and a range of 5QI values, an Allocation and Retention Policy (ARP) index and a range of ARP values, or a Maximum Flow Bit Rate (MFBR) and a range of MFBR values.

12. The network device of claim 11, wherein the QoS-based event information includes one or more identifiers that identify one or more end devices to which a QoS-based event pertains.

13. The network device of claim 11, wherein the ARP index includes at least one of a preemption vulnerability indication (PVI) value, a preemption capability indication (PCI) value, or a priority level (PL) value, and wherein the at least one of the PVI value, the PCI value, or the PL value includes a range of values.

14. The network device of claim 9, wherein the AM parameter and value includes at least one of a radio access technology frequency selection priority (RFSP) index or a user equipment aggregate maximum bit rate (UE AMBR).

15. The network device of claim 14, wherein the UE AMBR indicates a range of UE AMBRs.

16. The network device of claim 9, wherein the processor is further configured to:
compare information of the event to the subscription information.

17. A non-transitory computer-readable storage medium storing instructions executable by a processor or a policy control device, which when executed cause the processor to:
receive, from a first network device, a subscription request that includes quality of service (QOS)-based event information, which includes a QoS parameter and QoS values that include a first QoS value and a second QoS value that indicate a QoS range relating to the QoS parameter, or access and mobility (AM)-based event information, which includes an AM parameter and AM values that include a first AM value and a second AM value that indicate an AM range relating to the AM parameter;
generate subscription information based on the subscription request;
detect an event that matches the subscription information; and
notify the first network device of the event.

18. The non-transitory computer-readable storage medium of claim 17, wherein the QoS parameter and the QoS values include at least one of a 5G QOS Identifier (5QI) and a range of 5QI values, an Allocation and Retention Policy (ARP) index and a range of ARP values, or a Maximum Flow Bit Rate (MFBR) and a range of MFBR values.

19. The non-transitory computer-readable storage medium of claim 18, wherein the ARP index includes at least one of a preemption vulnerability indication (PVI) value, a preemption capability indication (PCI) value, or a priority level (PL) value, and wherein the at least one of the PVI value, the PCI value, or the PL value includes a range of values.

20. The non-transitory computer-readable storage medium of claim 17, wherein the AM-based event information includes at least one of a radio access technology frequency selection priority (RFSP) index or a user equipment aggregate maximum bit rate (UE AMBR).

* * * * *